US009013538B2

(12) United States Patent
Ellison et al.

(10) Patent No.: US 9,013,538 B2
(45) Date of Patent: Apr. 21, 2015

(54) IP-BASED CONFERENCING IN A TELECOMMUNICATIONS NETWORK

(71) Applicant: Level 3 Communications, LLC, Broomfield, CO (US)

(72) Inventors: Gregory Thomas Ellison, Erie, CO (US); Andrew James Broadworth, Thornton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 72 days.

(21) Appl. No.: 13/708,713

(22) Filed: Dec. 7, 2012

(65) Prior Publication Data

US 2013/0162756 A1 Jun. 27, 2013

Related U.S. Application Data

(60) Provisional application No. 61/578,794, filed on Dec. 21, 2011, provisional application No. 61/578,798, filed on Dec. 21, 2011, provisional application No. 61/578,803, filed on Dec. 21, 2011, provisional (Continued)

(51) Int. Cl.

*H04L 12/18* (2006.01)
*H04L 29/06* (2006.01)

(Continued)

(52) U.S. Cl.

CPC .............. *H04L 65/403* (2013.01); *H04L 12/18* (2013.01); *H04L 47/15* (2013.01); *H04M 3/56* (2013.01); *H04L 12/1818* (2013.01)

(58) Field of Classification Search

CPC ........ H04N 7/15; H04L 12/1818; H04M 3/56

USPC ............ 348/14.08; 370/221, 230.1, 235, 236, 370/237, 260, 352, 392; 379/202.01, 379/265.09; 455/416, 518; 709/203, 204, 709/205, 207, 223; 715/751

See application file for complete search history.

(56) References Cited

U.S. PATENT DOCUMENTS 5,280,583 A * 1/1994 Nakayama et al. ........... 709/205
5,623,603 A * 4/1997 Jiang et al. .................... 709/207

(Continued)

FOREIGN PATENT DOCUMENTS

EP 2053869 A1 4/2009

OTHER PUBLICATIONS

U.S. Appl. No. 13/971,531, filed Aug. 20, 2013, entitled "Routing of Conference Participant Based on Caller Recognition".

(Continued)

*Primary Examiner* — Gerald Gauthier

(57) ABSTRACT

Aspects of the present disclosure involve systems, methods, computer program products, and the like, for collaboration conferencing with multiple participants over a communications network, and more specifically for a conferencing routing service for managing and routing collaboration participants. In one embodiment, the conferencing system may utilize Session Initiation Protocol (SIP) to conduct the routing of the collaboration conferences within the telecommunications network. The SIP-based routing provides for the exchanging of information from one device of the conferencing system to another that is not available in non-IP based conferencing systems. Thus, through the use of IP-based telecommunication devices, the network provides beneficial features for collaboration conferencing.

20 Claims, 7 Drawing Sheets

302 RECEIVE REQUEST TO JOIN COLLABORATION COMMUNICATION

304 DETERMINE THE CONFERENCING BRIDGE TO HOST THE COLLABORATION COMMUNICATION

306 REQUEST OPEN PORT FROM IDENTIFIED CONFERENCING BRIDGE FOR REQUEST

308 RECEIVE ACKNOWLEDGEMENT OF OPEN PORT AT IDENTIFIED CONFERENCING BRIDGE

310 ROUTE PARTICIPANT TO IDENTIFIED CONFERENCE BRIDGE

Related U.S. Application Data application No. 61/578,807, filed on Dec. 21, 2011, provisional application No. 61/578,810, filed on Dec. 21, 2011, provisional application No. 61/584,115, filed on Jan. 6, 2012, provisional application No. 61/584,122, filed on Jan. 6, 2012.

(51) Int. Cl.
*H04L 12/801* (2013.01)
*H04M 3/56* (2006.01)

(56) References Cited

U.S. PATENT DOCUMENTS

| | | | | |
|---|---|---|---|---|
| 5,825,858 | A | 10/1998 | Shaffer et al. | |
| 6,411,605 | B1 | 6/2002 | Vance et al. | |
| 6,564,261 | B1 | 5/2003 | Gudjonsson et al. | |
| 6,646,997 | B1 | 11/2003 | Baxley et al. | |
| 6,657,975 | B1 | 12/2003 | Baxley et al. | |
| 6,879,565 | B2 | 4/2005 | Baxley et al. | |
| 6,885,740 | B2 | 4/2005 | Ernstrom et al. | |
| 6,898,273 | B2 | 5/2005 | Ernstrom et al. | |
| 6,961,416 | B1 | 11/2005 | Summers et al. | |
| 7,054,933 | B2 | 5/2006 | Baxley et al. | |
| 7,394,896 | B2 * | 7/2008 | Norton | 379/202.01 |
| 7,460,493 | B1 * | 12/2008 | Dhanoa et al. | 370/260 |
| 7,778,206 | B2 * | 8/2010 | Shaffer et al. | 370/260 |
| 7,889,660 | B2 * | 2/2011 | Bugenhagen | 370/236 |
| 8,060,563 | B2 | 11/2011 | Whynot et al. | |
| 8,068,425 | B2 * | 11/2011 | Bugenhagen | 370/235 |
| 8,189,468 | B2 * | 5/2012 | Bugenhagen | 370/230.1 |
| 8,194,643 | B2 * | 6/2012 | Bugenhagen | 370/352 |
| 8,229,096 | B1 | 7/2012 | Marquis et al. | |
| 8,289,965 | B2 * | 10/2012 | Bugenhagen et al. | 370/392 |
| 8,340,083 | B2 * | 12/2012 | Bugenhagen et al. | 370/352 |
| 8,364,133 | B1 * | 1/2013 | Lucey et al. | 455/416 |
| 8,428,634 | B2 * | 4/2013 | Schwagmann et al. | 455/518 |
| 8,665,758 | B1 * | 3/2014 | Mateer | 370/260 |
| 8,666,056 | B2 * | 3/2014 | Makagon et al. | 379/265.09 |
| 8,737,596 | B2 * | 5/2014 | Kelley et al. | 379/265.09 |
| 8,774,383 | B1 | 7/2014 | Marquis et al. | |
| 8,798,251 | B2 * | 8/2014 | Rajagopalan et al. | 379/202.01 |
| 2001/0002927 | A1 | 6/2001 | Detampel, Jr. et al. | |
| 2002/0075304 | A1 | 6/2002 | Thompson et al. | |
| 2002/0076025 | A1 | 6/2002 | Liversidge et al. | |
| 2002/0172341 | A1 | 11/2002 | Wellner et al. | |
| 2003/0023672 | A1 | 1/2003 | Vaysman | |
| 2003/0217174 | A1 | 11/2003 | Dorenbosch et al. | |
| 2004/0170266 | A1 | 9/2004 | Adams et al. | |
| 2004/0246332 | A1 | 12/2004 | Crouch | |
| 2005/0058125 | A1 | 3/2005 | Mutikainen et al. | |
| 2005/0213517 | A1 | 9/2005 | Rodman et al. | |
| 2007/0266077 | A1 * | 11/2007 | Wengrovitz | 709/203 |
| 2008/0031437 | A1 * | 2/2008 | Rey | 379/202.01 |
| 2008/0049753 | A1 | 2/2008 | Heinze et al. | |
| 2008/0063173 | A1 | 3/2008 | Sarkar et al. | |
| 2008/0218586 | A1 | 9/2008 | Graham et al. | |
| 2008/0253549 | A1 | 10/2008 | Loveland | |
| 2009/0019367 | A1 | 1/2009 | Cavagnari et al. | |
| 2010/0165889 | A1 | 7/2010 | Madabhushi et al. | |
| 2010/0169418 | A1 | 7/2010 | Whynot et al. | |
| 2013/0162756 | A1 * | 6/2013 | Ellison et al. | 348/14.08 |
| 2013/0163409 | A1 * | 6/2013 | Ellison et al. | 370/221 |
| 2013/0163435 | A1 * | 6/2013 | Ellison et al. | 370/237 |
| 2013/0163481 | A1 * | 6/2013 | Ellison et al. | 370/260 |
| 2013/0173706 | A1 * | 7/2013 | Broadworth et al. | 709/204 |
| 2013/0335513 | A1 * | 12/2013 | Broadworth et al. | 348/14.08 |
| 2013/0336170 | A1 * | 12/2013 | Broadworth et al. | 370/260 |

OTHER PUBLICATIONS

U.S. Appl. No. 13/971,634, filed Aug. 20, 2013, entitled "Collaboration Conference Linking in a Telecommunications Network".

International Search Report, dated Apr. 23, 2013, Int'l Appl. No. PCT/US13/020244, Int'l Filing Date Jan. 4, 2013, 5 pgs.

Written Opinion, dated Apr. 23, 2013, Int'l Appl. No. PCT/US13/020244, Int'l Filing Date Jan. 4, 2013, 16 pgs.

International Search Report, dated Mar. 19, 2013, Int'l Appl. No. PCT/US12/071018, Int'l Filing Date Dec. 20, 2012; 3 pgs.

Written Opinion, dated Mar. 19, 2013, Int'l Appl. No. PCT/US12/071018, Int'l Filing Date Dec. 20, 2012, 5 pgs.

Colbert, Raymond O. et al., "Advanced Services: Changing How We Communicate", In: *Bell Labs Technical Journal* [online], [retrieved on Feb. 11, 2013] Retrieved from the Internet <URL: http://www.herbsleb.org/web-pubs/pdfs/colbert-advanced-2001.pdf>, entire document Jun. 2001 , pp. 211-228.

International Preliminary Report on Patentability, dated Jun. 24, 2014, Int'l Appl. No. PCT/US12/071018, Int'l Filing Date Dec. 20, 2012; 8 pgs.

International Preliminary Report on Patentability, dated Jul. 8, 2014, Int'l Appl. No. PCT/US13/020244, Int'l Filing Date Jul. 8, 2014; 18 pgs.

* cited by examiner

IP-BASED CONFERENCING IN A TELECOMMUNICATIONS NETWORK

CROSS-REFERENCE TO RELATED APPLICATIONS

This application claims priority under 35 U.S.C. §119(e) to U.S. Provisional Application No. 61/578,794 entitled "SIP-BASED VOIP COLLABORATION", U.S. Provisional Application No. 61/578,798 entitled "SIP-BASED VOIP COLLABORATION", U.S. Provisional Application No. 61/578,803 entitled "SIP-BASED VOIP COLLABORATION", U.S. Provisional Application No. 61/578,807 entitled "SIP-BASED VOIP COLLABORATION" and U.S. Provisional Application No. 61/578,810 entitled "SIP-BASED VOIP COLLABORATION" all filed on Dec. 21, 2011 and each of which is incorporated by reference in there entirety herein. This application claims priority under 35 U.S.C. §119 (e) to provisional patent application 61/584,115 titled "CENTRAL CONFERENCING ROUTING SERVICE" and provisional patent application 61/584,122 titled "CENTRAL CONFERENCING ROUTING SERVICE," both filed on Jan. 6, 2012 and both of which are hereby incorporated by reference herein.

TECHNICAL FIELD

Aspects of the present disclosure generally relate to systems and methods that provide for collaboration conferencing with multiple participants using devices connected to a telecommunication network, including a VoIP network, and more specifically for a conferencing system utilizing one or more Internet Protocol (IP)-based telecommunication devices.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide a conferencing feature that allows several users of the network to communicate at once, rather than a simple person-to-person communication. The number of participants to a conference communication may range from a few users to several thousand users communicating on the same telephonic and/or data call.

Typically, conferencing communications require participants to the conference to place a telephonic call to a dedicated conferencing number. Some networks also require the participants enter a conference call code into the keypad of a telephonic device. The conferencing number and code are then utilized by the telecommunications network to connect that participant to a conferencing bridge device. In general, a conferencing bridge is a telecommunications device that hosts the participants of a conferencing communication such that the participants can attend the communication. Thus, the network typically receives the dialed number and conference code from each participant and connects the participant to the conferencing bridge. Once connected to the conference bridge, the participant may take part in the conferencing communication.

It is with these and other issues in mind, among others, that various aspects of the present disclosure were conceived and developed.

SUMMARY

One implementation of the present disclosure may take the form of a telecommunications network. The network may include at least one conference bridge and a least one routing device. The routing device is configured to receive a communication from a user of the telecommunications network, the communication comprising a request to initiate a collaboration conference, identify the at least one conference bridge and transmit a refer command configured to route the communication from the user to the at least one conference bridge. Further, the at least one conference bridge is a Session Initiation Protocol (SIP) based telecommunications device and is configured to host the collaboration conference in response to the communication from the user.

Another implementation of the present disclosure may take the form of a method for hosting a collaboration conference in a telecommunications network. The method include the operations of receiving a SIP request message for access to a collaboration conference from a requester's communication device, the request comprising an identifier of the requester in the header of the SIP request message and selecting a hosting conference bridge from a plurality of conference bridges associated with the telecommunications network and configured to host a collaboration conference, wherein the hosting conference bridge is a session initiation protocol (SIP) based telecommunication device. In addition, the method includes transmitting a SIP request message to the selected hosting conference bridge, wherein the SIP-based request message comprises at least the conference identification number and transmitting one or more SIP refer routing messages to the telecommunications network, wherein the one or more routing messages comprises at least an internet protocol (IP) address of the selected hosting conference bridge.

Yet another implementation of the present disclosure may take the form of a system for hosting a collaboration conference in a telecommunications network. The system includes a network interface unit configured to receive a communication from a user of a communications network to establish a collaboration conference on the network, an application server in communication with the network interface unit and a computer-readable medium connected to the application server. The computer-readable medium is configured to store information and instructions that, when executed by the application server, performs certain operations. Such operations include receiving a session initiation protocol (SIP) request message from a routing device of the network, the SIP request message comprising a request for at least one communication port of a hosting conference bridge associated with the network, wherein the hosting conference bridge is a SIP based telecommunication device, reserving at least one communication port of the hosting conference bridge and transmitting a SIP-based acknowledgement message in response to the SIP request message, the acknowledgement message comprising at least the IP address of the hosting conference bridge. Additionally, the operations also include receiving a SIP request message for access to a collaboration conference from a requester's communication device, the request comprising an identifier of the requester in the header of the SIP request message and hosting a collaboration conference of a plurality of users of the network.

DETAILED DESCRIPTION

Aspects of the present disclosure involve systems, methods, computer program products, and the like, for collaboration conferencing with multiple participants over a communications network, and more specifically for a conferencing system utilizing one or more Internet Protocol (IP)-based telecommunication devices. The term "collaboration conferencing" as used herein includes any type of multimedia conferencing over a network, such as audio conferencing, web or internet conferencing and multi-site video conferencing. In one embodiment, the conferencing system may utilize Session Initiation Protocol (SIP) to route collaboration conferences within the telecommunications network. The SIP-based routing provides for the exchanging of information from one device of the conferencing system to another that is not available in non-IP based conferencing systems. Thus, through the use of IP-based telecommunication devices, the network provides beneficial features for collaboration conferencing.

Figure 1:
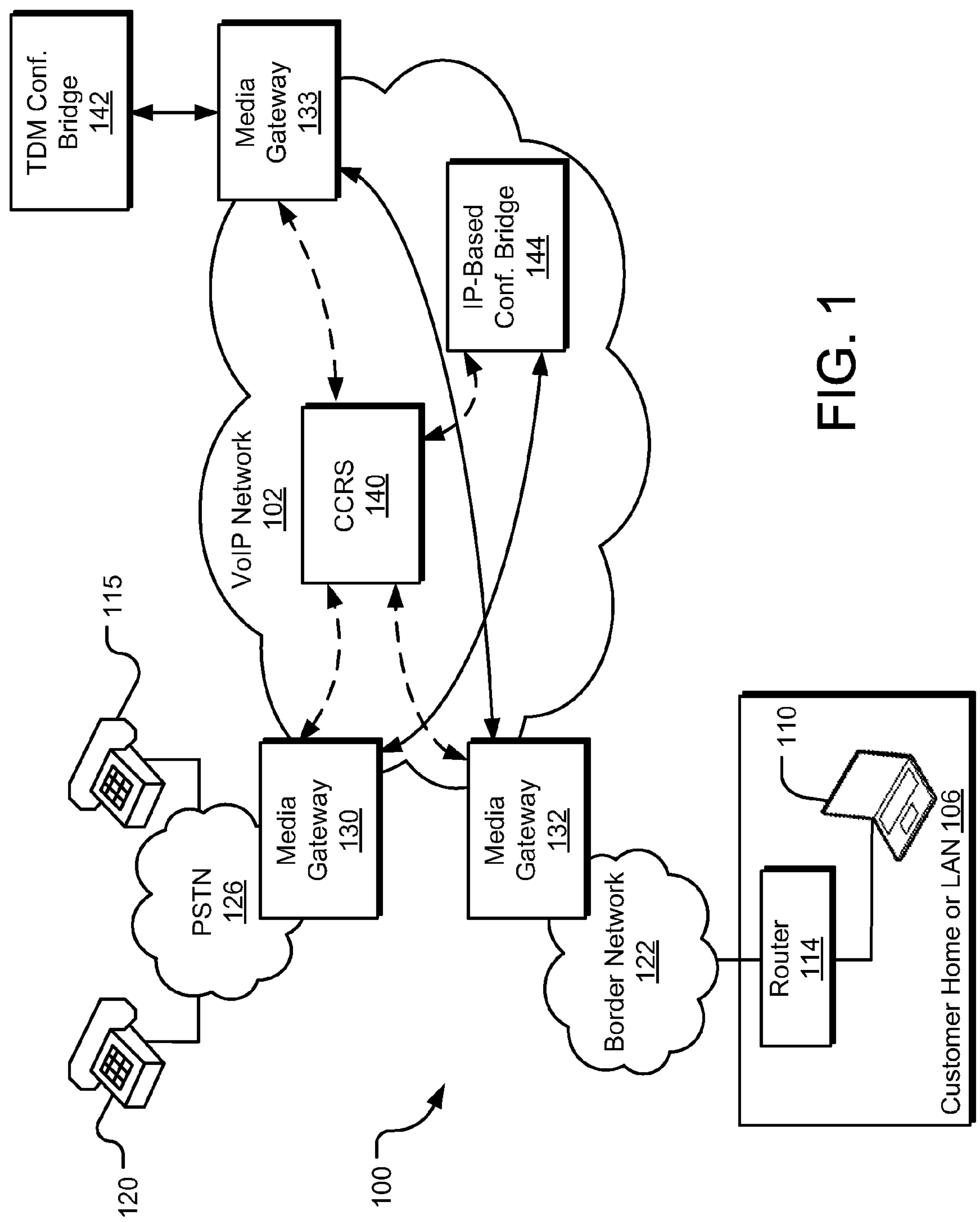
FIG. 1 schematic diagram illustrating an exemplary Voice over Internet Protocol (VOIP) operating environment, including a central conferencing routing server, in accordance with one embodiment.

FIG. 1 illustrates an exemplary operating environment 100 for hosting conference collaboration communications between multiple participants. The environment 100 provides for establishing communication sessions between network users. With specific reference to FIG. 1, the environment 100 includes a VoIP network 102, which may be provided by a wholesale network service provider. However, while the environment 100 of FIG. 1 shows a configuration using the VoIP network 102, it should be appreciated that portions of the network 102 may include non IP-based routing. For example, network 102 may include devices utilizing time division multiplexing (TDM) or plain old telephone service (POTS) switching. In general, the network 102 of FIG. 1 may include any communication network devices known or hereafter developed.

The VoIP network 102 includes numerous components such as, but not limited to gateways, routers, and registrars, which enable communication across the VoIP network 102, but are not shown or described in detail here because those skilled in the art will readily understand these components. More relevant to this description is the interaction and communication between the VoIP network 102 and other entities, such as the one or more customer home or business local area networks (LANs) 106, where a participant in a conference will connect with the system for the conference.

Customer network 106 can include communication devices such as, but not limited to, a personal computer or a telephone 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network and/or an analog telephone 115, 120. Components of the customer network 106 are typically home-based or business-based, but they can be relocated and may be designed for easy portability. For example, the communication device 110 may be wireless (e.g., cellular) telephone, smart phone, tablet or portable laptop computer.

The customer network 106 typically connects to the VoIP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the VoIP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device (130, 132). For ease of instruction, only three communication devices 110, 115, 120 are shown communicating with the VoIP network 102; however, numerous such devices, and other devices, may be connected with the network, which is equipped to handle enormous numbers of simultaneous calls and other communications.

In general, a request for a collaboration conference over the VoIP network 102 is initiated by a requester through one of the communication devices 110, 115, 120 associated with the network. As used herein, the term "collaboration conference" includes any type of collaboration between three or more users of a communication network. For example, the collaboration conference may include audio collaboration, video collaboration, web collaboration, a combination of any of the above, and the like. For ease of instruction, the collaboration conferences discussed herein are generally made in reference to an audio conference, although any type of collaboration conference over a telecommunications network is envisioned with respect to the present disclosure. Similarly, although FIG. 1 illustrates some of the communication devices 115, 120 as telephonic devices, the communication devices may be any type of communication device, including personal computers, cellular phones and the like.

Upon receipt of the request for a collaboration conference, the network 102 routes the request to a routing device 140 or routing devices integrated within the network 102. However, it should be appreciated that the routing device 140 may be a part of the network 102, may be separate from the network, or may have portions deployed in the network and out of the network. In addition, the routing device 140 may be resident on one or more components of the VoIP network 140, including several instances of the routing device 140 integrated throughout the network 140. Further, although only a single instance of a routing device 140 is illustrated in FIG. 1, any number of routing devices may be present in the network 102.

To transmit the request to the network, the requester uses the communication device 110, 115, 120 to enter a conference specific telephone number or access port. The routing device 140 receives the request to begin a collaboration conference or join an existing conference. In response, and described in more detail below, the routing device 140 may route the one or more requests to one of several conference bridges 142, 144 associated with the VoIP network 102 for hosting of the collaboration conference. Although only two conference bridges 142, 144 are shown in FIG. 1, it should be appreciated that any number of conference bridges may be associated with the network 102 for hosting collaboration conferences.

In general, the conference bridges 142, 144 provide a hosting site for a collaboration conference between a plurality of users of the network 102. Thus, the conference bridge A 142 may host a collaboration conference while the conference bridge B 144 may host an additional collaboration conference. In particular, the conference bridge A 142 is connected to the communications network 102 through a media gateway 133 similar to the media gateway disclosed above. This configuration may be utilized when the conference bridge 142 is a time division multiplex (TDM) bridge. Conference bridge B 144 is internal to the VoIP network 102 through which the communications of the conference are transmitted. This configuration is utilized for Internet Protocol (IP) based bridges and is generally described in more detail below.

One particular network and/or conference bridge platform supported by the network configuration 102 of FIG. 1 is a Session Initiation Protocol (SIP) based network. For example, the conference bridge B 144 may be a SIP-based conference bridge. Such IP-based components may provide additional conferencing features to the network by providing information concerning the collaboration conference in a header of a message transmitted through the network such as an identification of the collaboration conference, video integration, Uniform Resource Identifier (URI) based routing and conference integration, conference access credentials for authentication and permission to enter the requested conference. SIP-based conference bridges may also provide high definition audio, additional security features and transitions between collaboration conferences without having to redial into the system. In general, because components operating utilizing SIP can exchange information within a header, many additional features for a collaboration conference can be offered to participants on a SIP-based conference bridge. In addition, SIP-based CCRS devices may utilize many of the advantages of information exchange within the header when communicating with TDM-based network devices.

To connect to a collaboration conference, each participant to the conference may be routed to the same conference bridge 144 for the duration of the conference. The conference bridge 144, in turn, provides communication ports for each participant such that each participant can hear or otherwise participate in the collaboration conference. Any conference bridge known in the art or hereafter developed may be integrated into the system 100 of FIG. 1 for hosting a collaboration conference, including IP-based conference bridges. In addition, the term “conference bridge” or “bridge” includes any component of a communication network that provides an access point to one or more users of the network for a collaboration conference. For example, a “conference bridge” may also include such devices as a media server device, a gateway server device or the like as configured within the network 102.

In some instances, the conference bridge 144 or routing device 140, upon receipt of the request to initiate or join a collaboration conference, executes an application that queries the requester to enter an access code number that the requester enters into the communication device 110, 115, 120. With this information, the network 102 determines that the requester intends to initiate or join a collaboration conference and routes the request to a conference bridge, as explained in greater detail below.

Figure 2:
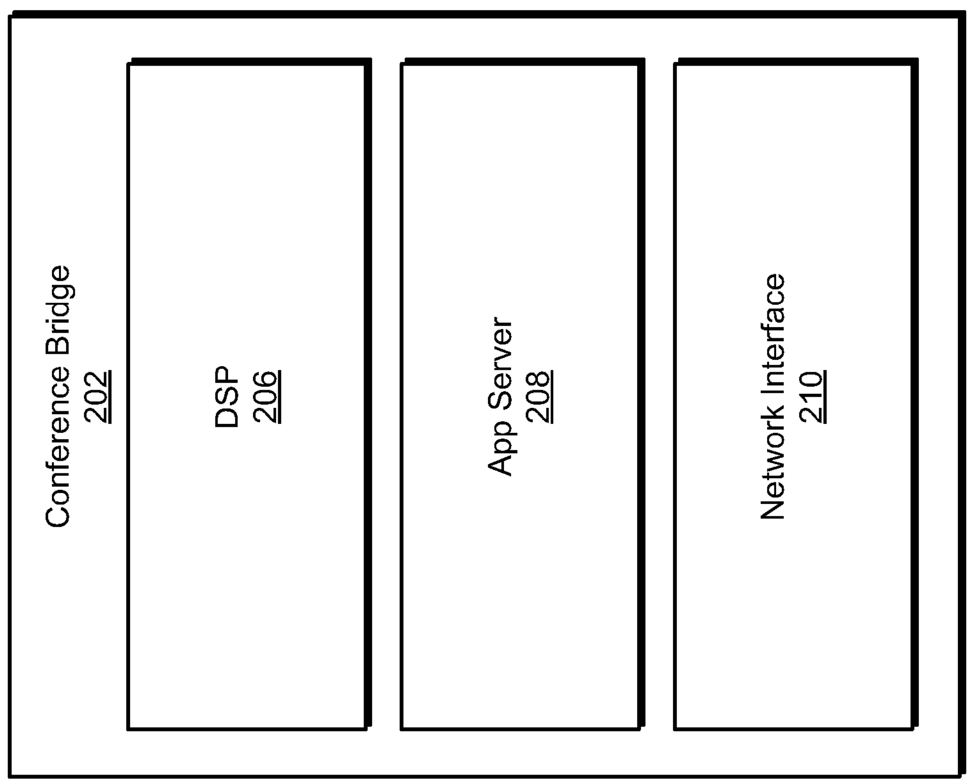
FIG. 2 is a block diagram illustrating a conference bridge configured to host one or more conferencing communications.

FIG. 2 is a block diagram illustrating an exemplary IP-based conference bridge device that may be utilized in the network configuration 100 of FIG. 1. The conference bridge 202 comprises an application server 208 and a digital signal processing (DSP) component 206. In general, the application server 208 of the conference bridge 204 communicates with one or more applications of the network to establish the collaboration conference. In addition, the conference bridge may include a network interface unit 210 that is configured as a proxy between the conference bridge 204 and the network. In general, the application server 208 includes one or more applications that can be executed by the conference bridge 202 to perform many of the functions described herein for the conference bridge. In addition, the network interface unit 210 receives information and/or instructions from the network 202 to route and connect a collaboration conference communication for that particular bridge. The network interface unit 210 connects directly to the core of the network 100 to receive the communications of the participants and connects each participant to each other to establish the collaboration conference. The network interface unit 210 may also initiate one or more of the applications stored in the application server for execution by the conference bridge.

The conference bridge 202 may receive a request from the network to connect a requester with a hosted conference. The request may be received through a signaling protocol, such as through the signal plane of a SIP-based communication. In response, the application server 208 may provision one or more ports for connection to the requester’s communication. The app server 208 may then signal to the network 102 that the ports are available, at which point the data or audio portion of the communication may be routed to an available port in the conference bridge 202. In this manner, the handshaking between the network and the conference bridge 202 may occur over the signaling plane of the IP-based protocol separate from the data or audio portion, known as the real-time transport protocol (RTP) plane, of the communication request. A more detailed description of the method through which a request is routed to a conference bridge 202 is included below with reference to FIG. 3.

In a SIP-based implementation of the network 102 and the conference bridge 144, the routing of the request to the conference bridge may include the transmission of one or more SIP-based commands, with each command including a header with information concerning the routing of the request. For example, the network 102 may route a request to the routing device 140. In one particular embodiment, the request is a SIP-based command and includes an identifier of the requester in the header portion of the command. The requester identifier may be any character based identifier, including telephone number, name of the requester, name of a group of company associated with the requester, or other identifier. In response, the routing device 140 selects a conference bridge that is hosting or will host the collaboration conference identified in the request. The routing device 140 then issues a SIP refer command to route the request from the ingress network of the requester to the selected conference bridge. The SIP refer command may include, among other information, an identification of the conference bridge in the header of the command. In response, the network then routes the requester's request to the conference bridge for connection to the collaboration conference. The operation of the routing device 140 and the conference bridge 144 are described in more detail in relation to FIGS. 3.

Figure 3:
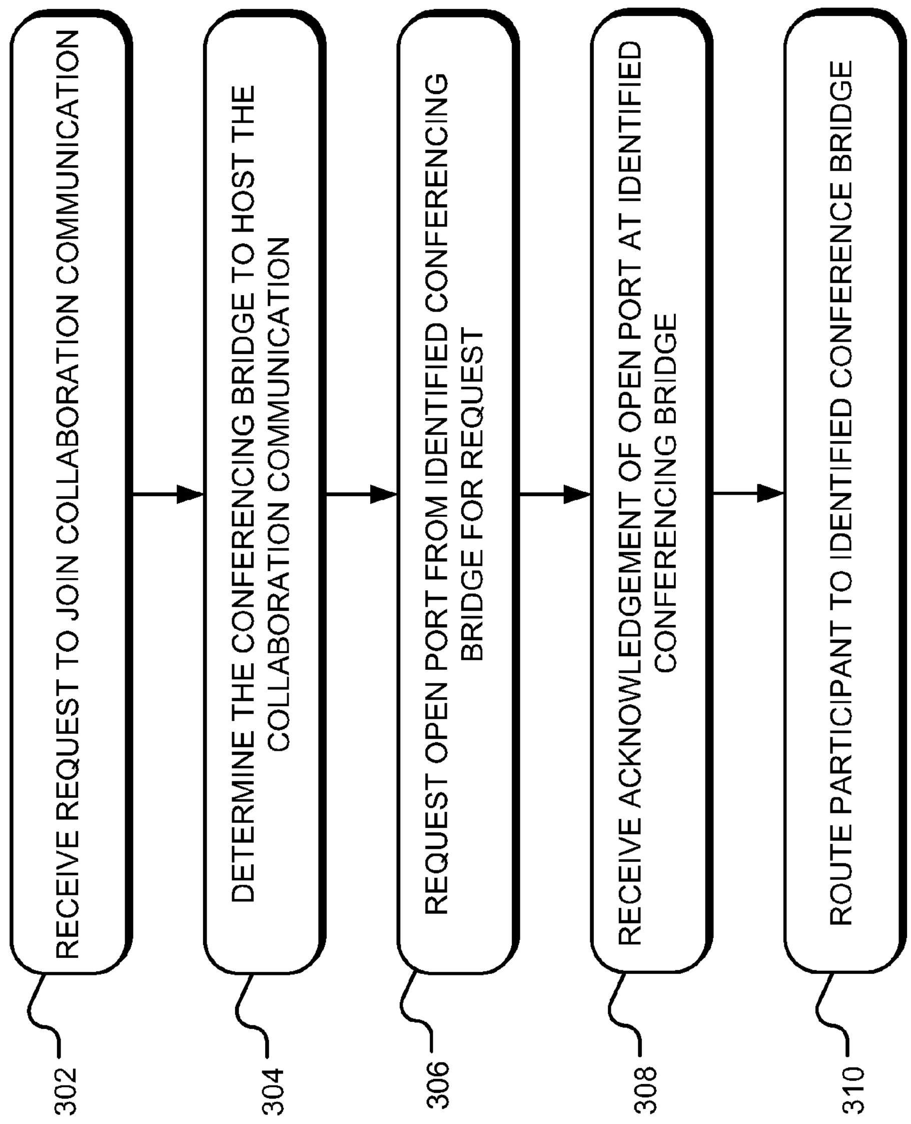
FIG. 3 is a flowchart of a method for the CCRS of the network 102 to receive a request from one or more participants to join a collaboration session and route the participants to the proper conference bridge.

In this manner, the network 100 may be utilized by one or more participants to a collaboration or conferencing communication hosted on a conference bridge 142, 144. In particular, FIG. 3 is a flowchart of a method for the routing device 140 of the network 102 to receive a request from one or more participants to join a collaboration session and route the participants to the proper conference bridge 142, 144 through which the collaboration is hosted. In general, the operations described in relation to the flowchart of FIG. 3 are performed by one or more components of the routing device 140 as part of the telecommunications network 102.

Beginning with operation 302, a participant to a conference communication may dial into or otherwise contact the network to join the conference using a communication device 110, 115 and/or 120. For example, the participant may dial a conference number and/or enter a conference code to access the collaboration conference. The media gateway 130, 132 or other switching device routes the request from the participant to the routing device 140 through the network 102. In FIG. 1, the request is illustrated by the dashed line between the media gateway 130, 132 and the routing device 140. As should be appreciated, in some IP networks, the request may be a SIP-based command routed to the routing device 140 on a signaling plane and does not include the audio portion of the communication. The request is then received by the routing device 140, as indicated by operation 302 of FIG. 3.

Upon receipt, the routing device 140 determines, in operation 304, which of the available conference bridges 142, 144 associated with the network 102 that is hosting or will host the collaboration conference requested by the participant. The routing device 140 may utilize several factors to determine which conference bridge 142, 144 hosts the collaboration conference. In addition, the routing device 140 may communicate with one or more of the conference bridges 142, 144 associated with the network 102 in operation 304. This communication between the routing device 140 and the conference bridges is illustrated by the dashed lines between the routing device and the conference bridges in FIG. 1. Further, in the embodiment in which the conference bridge 144 is within the network 100, the routing device 140 would communicate directly with the conference bridge without going through a media gateway device 133.

In one embodiment, the routing device 140 communicates particularly with the app server component 208 of the conference bridge 202 to determine the appropriate collaboration bridge and to establish the collaboration conference. The app server component 208 of the conference bridge 202 may provide any information concerning the conference bridge to the routing device 140, including number and types of available ports, the technical capabilities of the conference bridge, current collaboration conferences being hosted by the conference bridge, and the like. In the SIP-based conference bridge embodiment, the routing device 140 would communicate with the app server 208 through the network interface unit 210. The app server 208 then provisions the requested ports and notifies the routing device 140 when such ports are available for the collaboration conference. In addition, the app server 208 provides the information of the conference bridge 144 that may be utilized by the routing device 140 to determine which conference bridge will host the collaboration conference.

In operation 306, the routing device 140 requests an open communication port from the conference bridge 144 identified in operation 302. In the embodiment shown in FIG. 2, the conference bridge 202 may utilize a port in the DSP component 206 of the conference bridge in response to the request sent by the routing device 140. The open port in the DSP component 206 allows the participant to connect to the collaboration conference hosted by the conference bridge 202 and participate in the conference. In addition, the conference bridge 202 may transmit an acknowledgement to the routing device 140 from which the request originated to indicate that the requested communication is open. Again, in IP-based networks, the request for available ports and acknowledgement may occur on a separate communication signal than the audio or video portion of the collaboration communication. Further, a SIP-based network, the request may include certain information in the header of the request, such as the master ID number and/or the number of requested ports. The request made by the routing device 140 to the conference bridge is illustrated in FIG. 1 as the dashed line from the routing device to the media gateways associated with each conference bridge.

In operation 308, the routing device 140 receives the acknowledgement message from the conference bridge 144. In one embodiment, the acknowledgement message contains information that identifies the open port to the routing device 140. For example, in the SIP-based embodiment, the acknowledgment may include the IP address of the conference bridge in the header of the message. In response to receiving the acknowledgement message, the routing device 140 routes the participant's communication to the open port in the conferencing bridge 144 in operation 310. In one embodiment, the routing device 140 facilitates the communication to the conference bridge 144 such that the audio portion of the communication from the participant is no longer routed through the routing device. For example, in a network 102 that utilizes Session Initiation Protocol (SIP), the routing device 140 may issue a "SIP Refer" command to route the participant communication to the conference bridge 144, effectively removing the routing device from the communication flow. This refer message may include the IP address of the selected conference bridge in the header such that the network can route the communication to the selected conference bridge. The connection of the communication bypassing the routing device is illustrated in FIG. 1 as the solid line connecting the media gateway 130 associated with the participant's telephonic device 120 and the media gateway associated with conference bridge 144. Thus, through the use of the method outlined in FIG. 3, the CCRS 140 may receive a request from a participant of a collaboration conference and route the participant to the proper conference bridge that hosts the specific collaboration conference. In a similar manner, collaboration conference participants may be routed to media gateway 133 and conference bridge A 142 such that multiple conferences may be occurring simultaneously through the network 102 on multiple conferencing bridges 142, 144.

Figure 4:
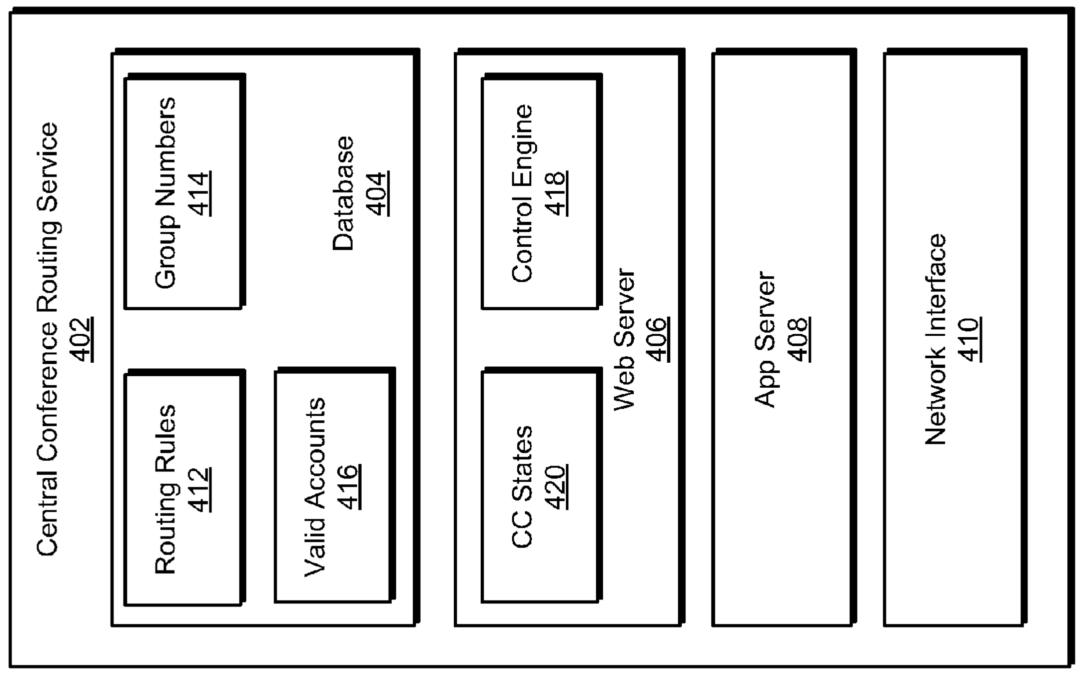
FIG. 4 is a block diagram illustrating several components of a central conferencing routing server.

FIG. 4 is a block diagram illustrating several components of a routing device 140 that may be implemented on the network 100 of FIG. 1. The components outlined may be implemented by one or more processors executing one or more computer instructions stored in a computer-readable medium. Examples of systems that may execute or implement the components are provided below with reference to FIG. 6. Also, as mentioned above, the components of the routing device 140 may be located on any number of computing devices within the network, on any number of computing devices outside of the network, and/or a combination of both.

The routing device 402 may include a database 404 configured to store information concerning an associated network, one or more customers or users of the network 416, identification numbers 414, and/or any other information useful by the routing device in routing, billing, load balancing, disaster recover and the like for collaboration conferencing communications. For example, the database 404 may store identification numbers 414 for individuals or groups of users to the network who have access to a collaboration conference feature. Associated with the identification numbers may be one or more telephone numbers, access codes, communication device identifications, master identifications and routing rules associated with the users. The database 404 may also store information associated with the routing 412 and handling of collaboration conferencing, such as accepted communication devices, welcoming messages and operational rules for conducting the collaboration conference. In general, any information that may be utilized by the routing device to route a collaboration communication and conduct the collaboration conference may be stored in one or more databases associated with the routing device.

The routing device also includes a web server 406 or web application that utilizes one or more applications stored in an application server 408 to execute the one or more applications. For example, the web server 406 may include one or more application programming interfaces (APIs) that execute any number of stored applications to perform the operations described herein. The web server 406 may also enable the provisioning of the databases 404 of the routing device by the application server 408. In addition, the routing device may include a network interface unit 410 as a proxy for receiving any type of information and/or instructions from the network 102 to route the communication. The network interface unit 410 may also initiate one or more of the applications stored in the application server or database for execution by the routing device and/or receive a request from the telecommunications network to initiate a collaboration conference.

Through the use of the described components, the routing device 402 provides added flexibility and features to collaboration conferencing not previously available. For example, because each collaboration conference request is routed through the routing device or system of routing devices, routing rules may be applied to a block of related requesters identified by a master ID number or customer number, removing the need to update the routing rules for each member associated with the master ID or customer number. In addition, the database 404 of the routing device 402 may maintain a control engine or state of a particular routing device that determines which conference bridge a collaboration conference occurs.

Figure 3B:
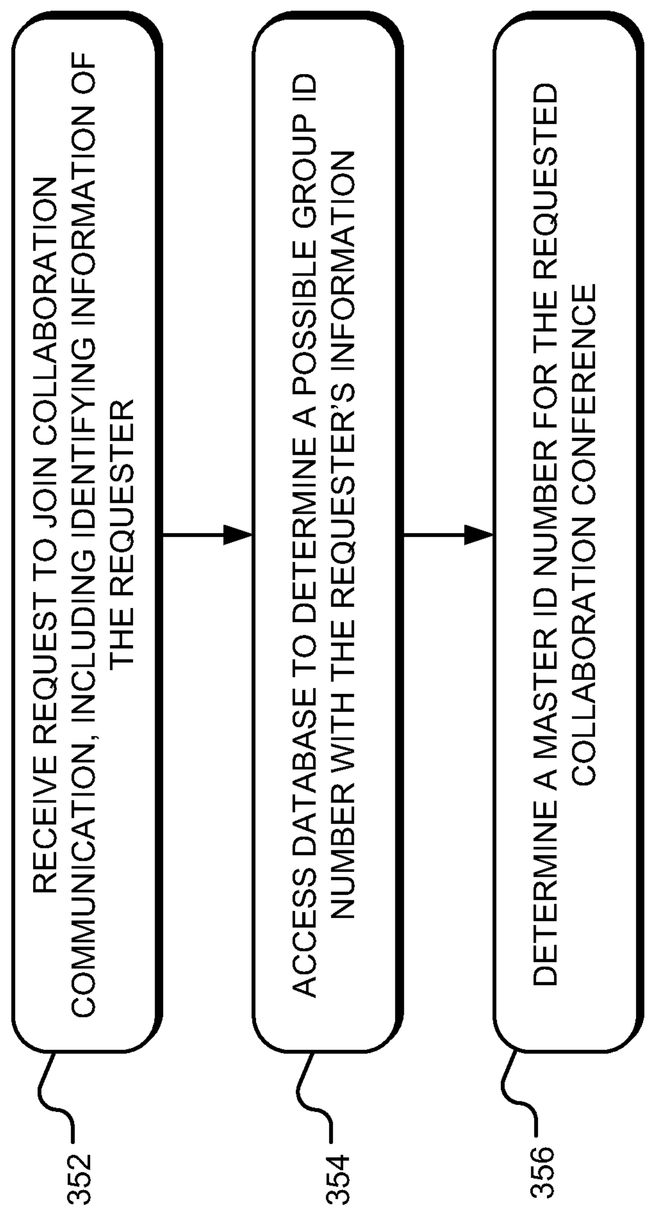
FIG. 3B is a flowchart illustrating a method for a central conferencing routing server to receive a request for a collaboration conference and associating a master identification number to the collaboration conference.

In operation, the routing device 402 may perform the operations of the flowchart of FIG. 3B. In particular, the routing device 402 receives a request to establish a collaboration conference at the network interface 410 in operation 352. The request may include information concerning the requestor, such as requestor's telephone number and access code number. However, although the operations of FIG. 3B are described in reference to the request comprising the requestor's telephone phone number and access code number, this is but one example of the information used by the CCRS to identify the requester. For example, the request may include an identification of the requester's communication device in the request header, such as a text string of the requester's personal computer. In another example, the requester's name may be used as the identifier of the requester in the request. Thus, any operation described herein utilizing the requester's telephone number and access code may be applied to other information contained in the request. For ease of instruction, however, the example of the telephone number and access code number is used.

Upon receiving the request, the application server 408, in concert with the web server 406, utilizes the requestor's telephone number and access code number to possibly determine a group ID number for the requester in operation 354. In particular, with the requester's information, the application server 408 accesses a lookup table stored in the database 404 to match the telephone number and code access number to the group ID number. In some instances, it is advantageous to associate a group ID number to a group of users of the collaboration conference system. For example, through the group ID, one or more routing rules may be applied to the entire group without the need to provide a routing rule for each individual member of the group. In some instances, the group ID number may be associated with a customer ID number such that each member associated with a customer ID number is given the same group ID number and alterations to the customer's account with the network can be applied to each group member through alterations to routing rules associated with the group ID number.

In operation 356, the application server 356 may also associate a master ID reference or number to the collaboration conference request and stores the master ID reference or number in the database 404. The master ID reference or number is utilized by the network to track the collaboration conference and the participants to the conference and may be associated with the requester's information. With the master ID number associated with the request, the application server 408 again accesses the database 404 to determine a state of the collaboration conference. In general, if the collaboration conference has been established on a conference bridge (such that the requester is a participant to the collaboration conference and not the initiator), the database 404 includes an identification of the conference bridge on which the collaboration conferencing is hosted. Alternatively, if the request is to initiate a new collaboration conference, the database includes a notification the request is a request for a new collaboration conference, at which point the application server routes the request to a master CCRS device that executes a master control engine application to determine which conference bridge will host the conference. In this manner, the components of the CCRS 402 receive the request to join or initiate a collaboration conference and route the request to the proper conference bridge.

As mentioned above, the database 402 may include a subscriber information table 414 that associates information of the requester (such as a telephone number, access code number or other identification or reference of a requestor) to a group ID number for the routing device system. Thus, several different requester references can be associated with the same group ID number, such as a customer number. In addition, one or more routing rules 412 can be associated with a group ID number in the database 402. For example, one routing rule 412 may restrict all collaboration conferences for a particular group ID number to a particular conference bridge. This removes the need to manually change the routing rules for each individual requester for all of the members of a particular group ID number. Further, the database 404 of the routing device 402 may be utilized by a control engine 418 of the routing device system to store information 416 utilized by the control engine, such as associating a master ID number of a collaboration conference with an ID of the conference bridge on which the conference is hosted, the status of a collaboration conference 420, the start time of the collaboration conference, the participant count of the conference, the maximum number of participants that have attended the particular conference, and the like. In general, the database 404 may include any information concerning collaboration conferences hosted by the telecommunications network.

Figure 5:
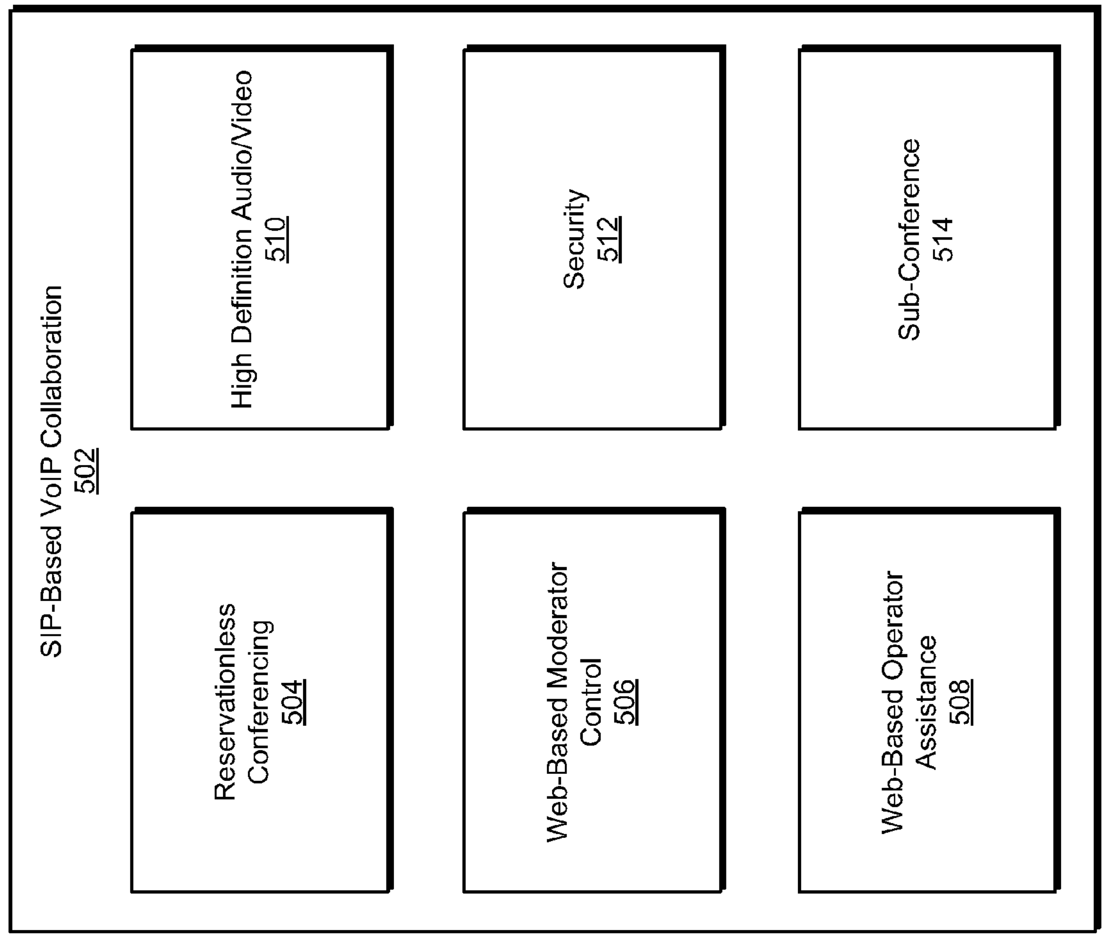
FIG. 5 is a block diagram illustrating features of an IP-based conference bridge for collaboration conferences hosted by the conference bridge.

The use of the SIP-based conference bridge 144, and in particular through the capability to pass information in a header of the SIP-based command, provides several advantages related to collaboration conferencing in a telecommunications network. Some of such features of the SIP-based conference bridge 502 are illustrated in FIG. 5. For example, the conference bridge 502 may provide reservationless conferencing 504 between the multiple users of the system. This feature enables users to set up collaboration conferences dynamically such that the session is "always on" or available. This may remove the need to establish a new session whenever a new collaboration conference is desired. Similarly, the SIP-based collaboration conferencing allows for switching from one conference to another without the necessity of establishing a new session. In particular, because the SIP-based commands may contain an identification of the requester in the header portion of the command, the requester's communication through the network is not necessarily tied to a dialed number. Rather, the header identifier in a SIP-reinivite command allows the requester to be shuttled between destination conferences as identified within the header of the SIP-based commands.

Another feature provided by the SIP-based collaboration conference bridge 502 includes a web-based moderator control 506, generally through a graphical user interface (GUI) accessed through the moderators computer. The moderator control 506 may allow a moderator of a collaboration session to control several features and the overall flow of the collaboration session. For example, the control 506 may provide information on the participants to the session, may allow the moderator to control the features available to which participant, establish a chairperson to the collaboration, control the view that each participant sees on their respective computers, mute one or more participants, disconnect one or more participants, etc. This feature is possible with the SIP-based conference bridge as an identifier of the collaboration conference can be passed in the header portion of the SIP command. Thus, the audio and/or video packets can be tied to or otherwise associated with the web-based packets such that the collaboration conference can include a web-based moderator control in a manner that provides association between the various parts of the collaboration conference.

Similarly, the SIP-based conference bridge 502 may allow for sub-conferencing 514 accessed and activated through the moderator control 506. Sub-conferencing 514 allows for the creation of one or more smaller collaborations from the participants of a larger collaboration. This feature may be activated by the moderator through the moderator control 506 or by a user through another control feature. In general, any configurable feature or information of the collaboration process may be made available to the moderator, and controlled, through the web-based moderator control 506. Similarly, the conference bridge 502 may provide a web-based operator assistance tool 508 that provides aid and technical support to moderators or users of the IP-based collaboration tool. Also, the SIP-based conference bridge 502 may include a phone-based participant control feature. This feature may be similar in use to the dual-tone multi-frequency (DTMF) signaling of traditional non-IP based conference bridge that allow a participant to press one or more buttons on the participant's phone to control aspects of the collaboration conference.

In addition, SIP-based conference bridges 502 provide high definition audio and video signals 510 for increased quality of collaboration conferences. In general, IP-based telecommunication devices have the capability of higher quality audio and video transmission such that high definition audio and video signals may be provided by the SIP-based conference bridge 502.

Security 512 measures may also be provided in the SIP-based conference bridge 502. Such security may allow for support for law enforcement requirements under the Commission on Accreditation for Law Enforcement Agencies (CALEA) guidelines. Additionally, the collaboration tool 502 may include fraud monitoring, encryption of command messages and control to ensure proper use of the conference bridge.

In addition to the additional features a SIP-based conference bridge 502 provides, the use of SIP commands may also be used to transmit information concerning one or more collaboration conferences to aid in the establishing and hosting of the conferences. For example, identification of the participants to a collaboration conference may be included in the header portion of a SIP command. Other information includes a conference identifier, the role of a requester (moderator or participant) and other information to aid in transmission of the multimedia signals of the conference.

Figure 6:
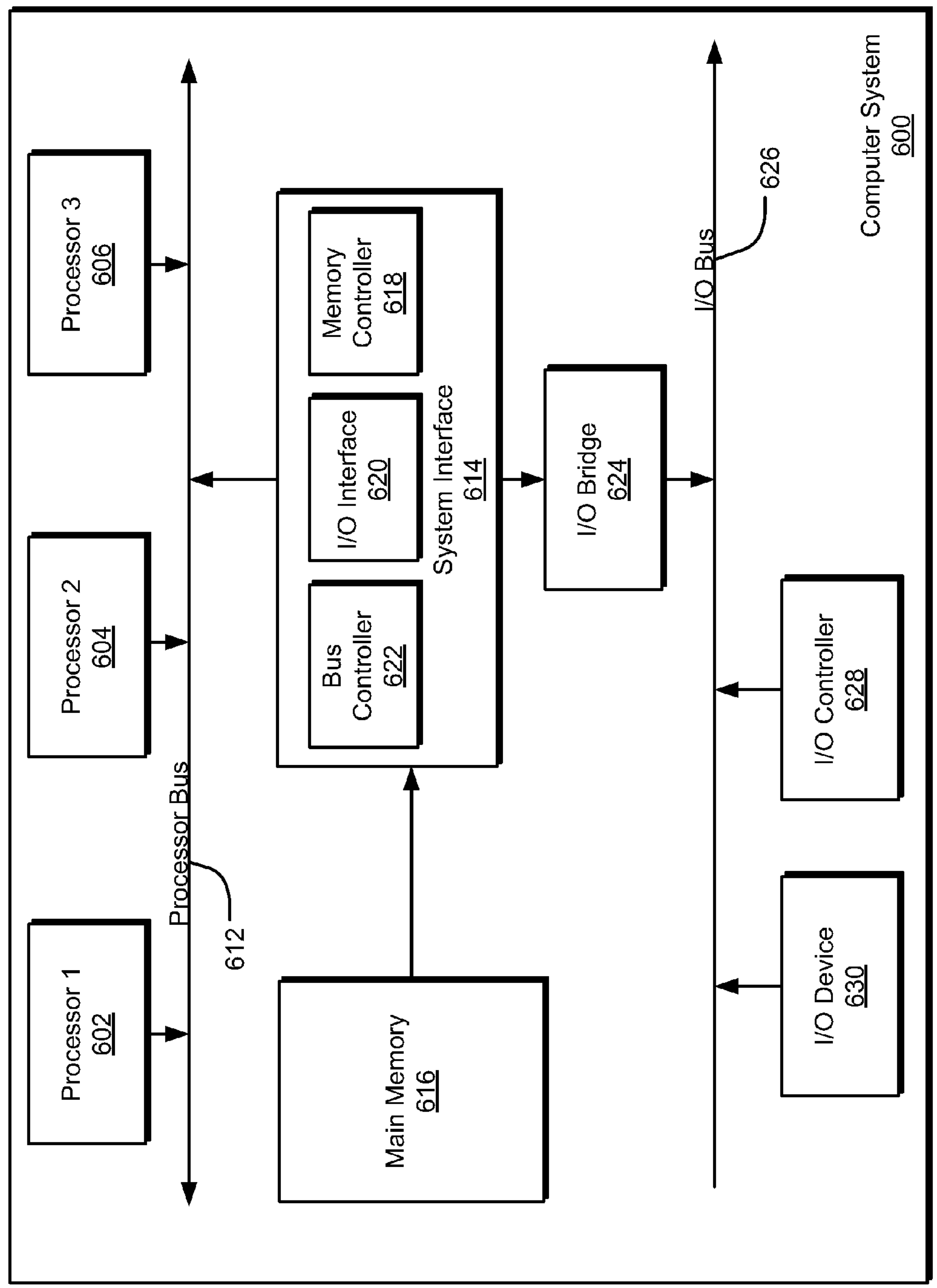
FIG. 6 is a diagram illustrating an example of a computing system which may be used in implementing embodiments of the present disclosure.

FIG. 6 is a block diagram illustrating an example of a computing device or computer system 600 which may be used in implementing embodiments of the present invention. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. Processors 602-606 may also be purpose built for processing/mixing media data, such as audio or video components of a media stream, such as a digital switch processor. System interface 614 may be connected to the processor bus 612 to interface other components of the system 600 with the processor bus 612. For example, system interface 614 may include a memory controller 616 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 660, as illustrated.

I/O device 660 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

As described, by utilizing one or more of the embodiments described above, the routing device system may route a collaboration conference communication to an appropriate conference bridge based on any number of preferences or information about the requester and/or communication network. In one example, the routing device may employ one or more control or state engines that monitor or maintain a status of the collaboration conferences occurring over the network. The control engines maintain information about each collaboration conference, such as a master identification number for the conference, a status (such as active, inactive, temporary, or unknown), the conference bridge on which the conference is hosted, a start time for the conference, a participant count, a maximum participant count and a stop time for the conference, among other information. In general, the control engines may obtain or receive any information about the conference and maintain a record of the information for use by the routing device system. As such, each control engine in the routing device may be connected to or otherwise associated with the conference bridges associated with the communications network to provide and receive information concerning the collaboration conferences of the network. In one embodiment, the control engines may be an application executed by the application server 408 with the information or data stored in the database 404. The operation of the control engine in relation to the routing device is described in more detail in concurrently filed nonprovisional application Ser. No. 13/708,659 titled "METHOD FOR ROUTING IN A CENTRAL CONFERENCING ROUTING SERVER," which is hereby incorporated by reference herein. Related features are also described in concurrently filed nonprovisional application Ser. No. 13/708,636 titled "Central Conferencing Routing Server," which is hereby incorporated by reference herein.

The routing device may utilize the information maintained by the control engines to perform several of the functions related to the routing of conference communications described above. For example, a request received by the routing device to join an existing collaboration conference may be routed to the correct conference bridge by referring to the information stored by the control engines. As mentioned above, the control engines maintain a status of each conference and the conference bridge on which the conference occurs. With this information, the routing device may appropriately route any additional participants to the correct conference bridge. Such information may also aid in routing requests for a new collaboration conference to a suitable conference bridge, including based on network performance and user preferences.

In one embodiment described above, the routing device routes the conference request to a conference bridge by requesting the conference bridge for an available port on the bridge. If the conference request is a request to establish a collaboration conference, the request may be for a plurality of available ports to host the conference. The allocation of available ports associated with the conference bridge for hosting the conference may be handled by a request from the routing device or by a control server associated with the conference bridge. In either case, available ports of the conference bridge may be made available in response to the conference request. In other embodiments, selection of a conference bridge may be accomplished using domain name system (DNS) resolution techniques, such as round-robin selection or intelligent algorithms that take into location and/or proximity considerations (e.g., Anycast), load on the bridges, popularity or any other known policy. Such techniques may either replace or supplement the routing protocols as part of the conference bridge selection process.

As mentioned above, the routing device system may include a plurality of routing devices or control engines executing on several application servers. As such, the network may determine a master control engine application to be executed on one of the routing devices that is tasked with routing new collaboration conference requests. In one embodiment, the master control engine may be determined by connection criteria. For example, each control engine of the routing devices may maintain a total number of bridges that are connected to all of the control engines with which the local control engine is communicating. In this embodiment, the control engine that sees the highest total number of bridges is selected as the master control engine and handles all collaboration conference requests. However, if more than one control engine sees the highest total number of bridge connections, the control engine with the highest number of local connections between the control engines with the highest total number is selected as the master control engine. If no single control engine is selected by the first two criteria, than a prioritized system ID may be employed to select the master control engine. It should be appreciated that this is but one example of a method for selecting the master control engine and any method to select a master control engine from the operating control engines may be employed. The use of a master control engine to determine which conference bridge a new collaboration conference is established may aid in preventing a split conference being established on multiple bridges. Additionally, any control engine of the routing device may act as the master control engine based on any criteria, including the example mentioned above. Some delay may be incorporated into the switching the master control engine from one engine to another to prevent bouncing from one engine to another rapidly.

In addition to the master control engine feature, the routing device system may also incorporate a priority table or list into a decision process when determining which conference bridge to host the collaboration conference. The information or data within the priority table may be stored in one or more databases of the routing device. In general, the priority list is associated with a customer number or other identifying number of a requester that lists one or more conference bridges that may host a collaboration conference and a priority associated with each conference bridge in the list. For example, the priority list for one customer may include three conference bridges ranked in order by the highest priority to the lower priority. In some embodiments, a plurality of conference bridges may be grouped into a single priority group. Upon receipt of a request for a collaboration conference, the master control engine may identify the requester, access the priority list associated with the requester and select a conference bridge based on the priority list. As discussed in more detail below, the priority of the conference bridges for any requester may be based on several criteria. The operation of the load balancing and priority routing in relation to the CCRS is described in more detail in concurrently filed nonprovisional application Ser. No. 13/708,678 titled "LOAD BALANCING IN A CENTRAL CONFERENCING ROUTING SERVER," which are hereby incorporated by reference herein.

In one example of such criteria, one or more conference bridges may be assigned a higher priority based on the geographical location of the conference bridge. For various reasons, a conference bridge located in a particular area may be preferable for hosting a collaboration conference from a particular requester. For example, a conference bridge located nearer the requester may be preferable to one located a far distance as the connection speed and clarity may be improved for a conference bridge located nearer the requester. In this situation, the priority list for that requester may be updated or created to provide priority to the conference bridge near the requester such that, upon determining which conference bridge to host the collaboration conference, the master state engine may first consider the higher prioritized bridge.

Similarly, a higher priority may be given to a conference bridge that provides additionally requested features for the collaboration conference. For example, the customer to the network may request a collaboration conference occur in wideband audio or other features that require an IP-based conference bridge. In this situation, an IP-based conference bridge may be given a higher priority than non-IP-based conference bridges in an attempt to meet the requests of the requester. Other priority criteria may be the size or other network requirements of the conference. For example, a requester may routinely request a high volume conference such that the routing device may associate a conference bridge that handles larger conferences (conferences with more participants) a higher priority for that particular requester. In general, however, any information or criteria may be considered when the routing device prepares the priority list associated with a requester.

Another advantage that the priority list provides is in the situation when a conference bridge is placed offline or suffers a failure. For example, a scheduled maintenance on one of the conference bridges may be desired by a network administrator. Thus, conferences currently being hosted on the conference bridge for repair may be maintained by the CCRS, but new conferences may be directed to other conference bridges in an effort to remove the conferences from the selected conference bridge. To accomplish this, the CCRS may remove the selected conference bridge from the priority lists for each requester. Thus, when a request is received and the CCRS consults the priority list for the requester, the selected bridge is not an available option. However, the master control engine may continue to direct requests for ongoing conferences to the proper conference bridge. The operation of disaster recovery in relation to the CCRS is described in more detail in concurrently filed nonprovisional application Ser. No. 13/708,689 titled "DISASTER RECOVERY WITH A CENTRAL CONFERENCING ROUTING SERVER," which are hereby incorporated by reference herein.

The CCRS may perform a similar operation when a conference bridge enters a failure state. In this situation, the failed bridge may be removed from the priority list for each requester. In addition, all requests received by the CCRS to join an existing conference may be sent to another conference bridge. However, this may create a situation where a conference is split between two conference bridges. In this situation, the CCRS may generate a notice to a network administrator of the potential for a split conference so that the administrator may direct each participant of the split conference to a single, operating conference bridge. In some embodiments, the recovery of a split conference into a united conference may be performed automatically by the CCRS upon detection. In addition, upon bringing the failed bridge back online, the CCRS may throttle the conferences placed on the bridge to prevent an overload of the bridge.

The routing device includes other features that may aid the network in transmitting collaboration conferences. For example, one embodiment of the routing device may route an internet or web connection that is associated with the collaboration conference to the same conference bridge that hosts the conference to maintain continuity between the related web application and the conference. Further, the routing device may maintain a list of technical capabilities of each conference bridge to ensure that particular technical requests are met. For example, one of the conference bridges may operate using SIP or another IP-type protocol. Such conference bridges provide additional technical features over traditional TDM based conference bridges, such as high definition audio, video and audio combination and the like. Thus, in response to a request for a collaboration conference to include particular technical features, the routing device may route the collaboration conference to a conference bridge that supports the technical features of the conference.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A telecommunications network comprising:

at least one conference bridge; and at least one routing device configured to:

receive a communication from a user of the telecommunications network, the communication comprising a request to initiate a collaboration conference;

identify the at least one conference bridge; and transmit a Session Initiation Protocol (SIP) refer command configured to route the communication from the user to the at least one conference bridge;

wherein, the at least one conference bridge is a SIP-based telecommunications device and is configured to host the collaboration conference in response to the communication from the user.

2. The telecommunications network of claim 1 wherein the at least one routing device is further configured to:

transmit a SIP-based request message to the at least one conference bridge, wherein the SIP-based request message comprises at least a request for an open communication port of the at least one conference bridge.

3. The telecommunications network of claim 2 wherein the at least one conference bridge is further configured to transmit an acknowledgement message from the at least one conference bridge in response to the request message, the acknowledgement message comprising at least the Internet Protocol (IP) address of the at least one conference bridge.

4. The telecommunications network of claim 3 wherein the refer command is a SIP-based transmission message comprising at least the Internet Protocol (IP) address of the at least one conference bridge.

5. The telecommunications network of claim 1 wherein the routing device comprises:

a network interface unit for receiving the communication from a user of the telecommunications network; and an application server configured to execute an application to transmit the refer command configured to route the communication from the user to the at least one conference bridge.

6. The telecommunications network of claim 2 wherein the communication from the user of the telecommunications network further comprises an identification of the user and the routing device is further configured to:

associating a conference identification number with the identification of the user of the communication request; and wherein the SIP-based request message to the at least one conference bridge further comprises the conference identification number.

7. The telecommunications network of claim 6 wherein the identification comprises a text string unique to the user of the telecommunications network.

8. The telecommunications network of claim 6 wherein the collaboration conference comprises a web-based conference component and an audio component and the SIP-based request message to the at least one conference bridge further comprises a request for an audio communication port and an IP communication port.

9. A method for hosting a collaboration conference in a telecommunications network comprising:

receiving a SIP request message for access to a collaboration conference from a requester's communication device, the request comprising an identifier of the requester in the header of the SIP request message;

selecting a hosting conference bridge from a plurality of conference bridges associated with the telecommunications network and configured to host a collaboration conference, wherein the hosting conference bridge is a session initiation protocol (SIP) based telecommunication device;

transmitting a SIP request message to the selected hosting conference bridge, wherein the SIP-based request message comprises at least the conference identification number; and transmitting one or more SIP refer routing messages to the telecommunications network, wherein the one or more routing messages comprise at least an internet protocol (IP) address of the selected hosting conference bridge.

10. The method of claim 9 further comprising:

receiving a SIP-based acknowledgement message from the selected hosting conference bridge in response to the SIP-based request message, the acknowledgement message comprising at least the IP address of the selected conference bridge.

11. The method of claim 9 further comprising associating a conference identification number with the identification of the user of the communication request; and wherein the SIP-based request message to the at least one conference bridge further comprises the conference identification number.

12. The method of claim 11 wherein the identification comprises a text string unique to the requester of the telecommunications network.

13. The method of claim 11 wherein the identification comprises a telephone number of the requester's communication device unique and an access code number.

14. The method of claim 9 further comprising:

transmitting a SIP-request command requesting operational information of the plurality of conference bridges, the operational information comprising at least the available capacity for the plurality of conference bridges.

15. The method of claim 9 wherein the SIP based conference bridge is configured to provide high definition audio and high definition video capabilities for the collaboration conference.

16. The method of claim 9 further comprising:

receiving a SIP-reinvite command comprising at least the identifier of the requester, the SIP-reinvite command configured to switch the requester from a first collaboration conference to a second collaboration conference.

17. A system for hosting a collaboration conference in a telecommunications network, the system comprising:

a network interface unit configured to receive a communication from a user of a communications network to establish a collaboration conference on the network;

an application server in communication with the network interface unit; and a computer-readable medium connected to the application server configured to store information and instructions that, when executed by the application server, performs the operations of:

receiving a session initiation protocol (SIP) request message from a routing device of the network, the SIP request message comprising a request for at least one communication port of a hosting conference bridge associated with the network, wherein the hosting conference bridge is a SIP based telecommunication device;

reserving at least one communication port of the hosting conference bridge;

transmitting a SIP-based acknowledgement message in response to the SIP request message, the acknowledgement message comprising at least the IP address of the hosting conference bridge;

receiving a SIP refer message; and hosting a collaboration conference of a plurality of users of the network.

18. The system of claim 17 wherein the communication port is a video communication port configured to transmit video packets through the network.

19. The system of claim 17 wherein the communication port is a web-based communication port configured to transmit internet protocol (IP) data packets through the network.

20. The system of claim 17 wherein the SIP request message from the routing device comprises an identifier of the requester's communication device in a header portion of the SIP request message from the routing device.

* * * * *